3,533,940
METHOD FOR TREATING AN AQUEOUS MEDIUM WITH CHITOSAN AND DERIVATIVES OF CHITIN TO REMOVE AN IMPURITY
Quintin P. Peniston and Edwin Lee Johnson, both of 4900 9th Ave. NW., Seattle, Wash. 98107
No Drawing. Filed June 2, 1967, Ser. No. 643,077
Int. Cl. B01d 21/01
U.S. Cl. 210—52          45 Claims

ABSTRACT OF THE DISCLOSURE

This invention relates to chitosan and derivatives of chitin. There is presented a method for making a partially deaminated chitin and a partially deaminated and deacetylated derivative of chitin. Also, there are presented methods for treating impurities in an aqueous medium with chitosan and derivatives of chitin.

---

Chitin has been known as the organic skeletal substance in the shells of crustacea (crabs, lobsters, shrimp, etc.) and in insects and in some fungi for nearly one hundred years. It has been found to be a linear polymer of N-acetyl-2-deoxy-2-amino glucose with a 1-4-beta-linkage between the monomer units analogous to the structure of cellulose. Chitin may be considered to be a linear polymer of chitobiose, an aminopolysaccharide. The degree of polymerization of the polymer is also similar to that of cellulose with chains of 1000–3000 basic units, i.e., a molecular weight of several hundred thousand.

Chitin is found to be essentially insoluble in water and organic solvents and to be highly resistant to hydrolytic cleavage. It is soluble in concentrated mineral acids and in such media undergoes hydrolysis and deacetylation to yield 2-deoxy-2-amino glucose (chitosamine). Certain enzymes found in snails and marine organisms cause hydrolysis without deacetylation yielding 2-deoxy-2-acetylamino glucose. It also appears from our own studies that putrefactive bacteria can cause deamination of chitin without substantial hydrolytic cleavage of the linkages between glucose units.

Chitin is generally isolated and purified from crustacea shells by first dissolving the inorganic material calcium carbonate, by treatment with cold dilute hydrochloric acid. Then, the protein material is removed by digestion in hot dilute alkali and bleached with permanganate followed by treatment with oxalic acid. The product is a white, leathery material retaining the shape of the shell fragments initially treated. The yield of chitin varies from about twenty (20%) percent of the weight of heavily armored shells such as the claws of crab to about thirty-five to forty (35–40%) percent of the weight of shrimp shells.

Few uses have been found for unmodified chitin due presumably to its lack of solubility and intractable physical characteristics. In the present invention new uses for chitin derivatives have been found in the field of precipitants and coagulants for water treatment and purification and as color and tannin removal agents. We feel that derivatives of chitin have marked and general utility in the above fields. The behaviour of chitin derivatives in these applications is found to be dependent on the polymer size (extent of hydrolytic cleavage); the degree of deacetylation of the native chitin; and, the amine content. A wide range of properties in the derived products can be obtained by control of these factors in the preparation of chitin and its subsequent modification treatment. It has been found that partial deacetylation of chitin by treatment with concentrated alkali solutions at 130–150° C. yields products which are soluble in dilute acetic acid to yield relatively non-viscous solutions having good coagulant power for clay suspensions. Similarly, prepared deacetylated products from chitin which have undergone partial deamination by bacterial action prior to isolation yield highly viscous solutions in dilute acetic acid which appear to have coagulant properties superior to the non-deaminated products in some applications but show inferior performance in others.

Accordingly, an object of this invention is to provide a derivative of chitin and which derivative may, by itself, be used for treating an impurity in an aqueous medium; to provide a derivative of chitin and which derivative in combination with coagulants may be used for treating an impurity in an aqueous medium; to provide a use for the shells of crustacea, and which shells of crustacea are a waste product and also a contaminant; to provide a method for preparing a partially deaminated chitin; to provide a method for preparing a partially deaminated and partially deacetylated chitin; and, to provide a derivative of chitin which is highly viscous and may be used for raising the viscosity of a solution.

These and other important objects and advantages of the invention will be more particularly brought forth upon reference to the details of the specification of the invention and the appended claims.

The shell of crustacea used in preparing the chitin, chitosan, partially deaminated derivative of chitin and partially deaminated and partially deacetylated derivative of chitin was from the King crab of Alaska. The shell of the King crab had some crab meat attached to it. The shell of the King crab was comminuted to form small pieces of shell such as ¼" x ¼", ½" x ½", and smaller. In preparing the shell for use, the calcium carbonate was removed by immersing the shell in cold dilute hydrochloric acid. The strength of the hydrochloric acid was approximately 1 normal. The temperature was at room temperature and the shell was immersed for a period of two hours to three hours to allow the calcium carbonate to react. Then, the shell was removed from the hydrochloric acid and thoroughly rinsed with water. The shell after treatment with hydrochloric acid still had some protein associated with the chitin in the shell. The protein was removed by treating the shell with an alkali. The alkali used was caustic soda of approximately a three (3%) percent strength. The shell was cooked in the three (3%) percent sodium hydroxide aqueous solution for a period of approximately two hours at a temperature of about 100° C. and at atmospheric pressure. The shell was thoroughly rinsed with water to remove any traces of the sodium hydroxide and residual meat. Then, the shell was bleached with a potassium permanganate solution. The shell was then thoroughly rinsed with water and treated with oxalic acid to remove any remaining permanganate solution. The result was a white, a practically pure white, shell of relatively small particle size. The small particles appeared to have a somewhat leathery appearance.

The shell was then treated with a forty (40%) percent caustic soda solution at 150° C. to remove some of the acetyl groups from the chitin. In this treatment some of the acetyl groups are removed from the chitin to form a partially deacetylated chitin or chitosan.

From a consideration of the formula for chitin and using nitrogen as the tie element it is possible to calculate the per cent deacetylation of chitin. For example, with chitin having no deacetylation or all of the acetylated groups present the per cent of nitrogen is approximately 6.9%. With 100% deacetylation or no acetylated groups present the percentage of nitrogen has increased to approximately 8.7%. By drawing a straight line on a graph between these two points it is possible to determine the percent deacetylation when the percent of nitrogen is known in the derivative of chitin. This percent deacetylation can easily and readily be read from the graph.

The deacetylated chitin or chitosan was used to treat an impurity in an aqueous medium. The chitosan was used as a coagulant to treat the impurity. In order to use the chitosan it is necessary to dissolve the chitosan. The chitosan was dissolved in a carboxylic acid solution. For example, the chitosan was dissolved in a 10% acetic acid solution by weight merely by adding the chitosan to the solution and stirring. Similarly, the chitosan was dissolved in a 10% citric acid solution by weight merely by adding the chitosan and stirring. In this manner it is possible to prepare a solution of known strength of chitosan and then to dilute the solution to a desired concentration, say 100 parts of chitosan per 1,000,000 parts of solution. The pH of the chitosan solution is in the range of 4 to 5.

A number of aqueous mediums having impurities were prepared and were treated by chitosan, deacetylated chitin, with the chitosan functioning as a coagulant. A summary of these results is presented in the following examples.

EXAMPLE I

An infusion of oak and maple leaves was prepared by boiling the dead leaves in distilled water, cooling and filtering. The infusion was found to contain 1024 p.p.m. (parts per million) of dissolved solids. 18% of the dissolved solids was inorganic. The tannin and polyphenolic material content was determined photometrically after reaction with ferric chloride and using similarly treated solutions of gallotannic acid as standard. The tannin and polyphenolic material content of the infusion, calculated as gallotannic acid, was found to be 20.1 p.p.m. A series of dilutions of the infusion with distilled water were treated with various quantities of chitosan. The coagulation, settling and color removal, were determined. This data, in terms of tannin, is shown in the following Table I.

liquid solution, in a carboxylic acid such as acetic acid. These results are comparable to commercial products used for tannin removal from tea, wines and malt beverages.

EXAMPLE II

Waste water from a commercial gravel washing operation was allowed to settle for 24 hours. The highly turbid supernatant water was then treated with various amounts of alum (aluminum sulfate) and chitosan. The total solids content in the supernatant liquid were then determined after the supernatant liquid had been allowed to settle for 20 hours with the alum and chitosan in the supernatant liquid. The result is presented in the Table II.

TABLE II.—SETTLING OF TURBID MATTER

| Sample | Original solids, p.p.m. | Treating agent, p.p.m. | Concentration of treating agent, p.p.m. | Residual solids (settling time, 20 hours), p.p.m. |
|---|---|---|---|---|
| 1 | 744 | None | | 744 |
| 2 | 744 | Chitosan | 0.2 | 0 |
| 3 | 744 | Alum | 40 | 344 |
| 4 | 744 | ----do---- | 80 | 0 |
| 5 | 744 | ----do---- | 100 | 0 |

It is seen that with no coagulants added that the residual solids in the supernatant liquid, after settling for 20 hours, were the same as in the original supernatant liquid. With chitosan added to a concentration of 2/10 p.p.m. it is seen that after 20 hours there was no residual solid in the supernatant liquid. However, with an alum concentration of 40 p.p.m. it is seen that the residual solid concentration was approximately 344 p.p.m. or slightly less than one half of the original solid concentration in the supernatant liquid. With an alum concentration of 80 p.p.m. it is seen that the residual solid content of the supernatant liquid was 0 p.p.m. From this it can be stated that 2/10 p.p.m. of chitosan is more effective than 40 p.p.m. of alum for settling a residual solid in a washing operation from a gravel pit. Or, the chitosan appeared to have a greater coagulation power than alum.

EXAMPLE III

Samples of the wash water from the gravel washings of Example II were used. There was prepared a solution A comprising 100 p.p.m. of alum plus 0.5 p.p.m. of chitosan. Also, there was prepared a solution B comprising 100 p.p.m. of alum plus 0.5 p.p.m. of Separan. Separan is a product of The Dow Chemical Company, Midland,

TABLE I.— COLOR AND TANNIN REMOVAL FROM LEAF INFUSION BY CHITOSAN

| | Dilution of original infusion | | | | | |
|---|---|---|---|---|---|---|
| | No dilution | 8-10 | 6-10 | 5-10 | 4-10 | 2-10 |
| Dissolved solids, p.p.m. | 1,024 | 819 | 614 | 512 | 409 | 205 |
| Chitosan added, p.p.m. | 75.0 | 62.5 | 37.5 | 25.0 | 12.5 | 6.25 |
| Tannin, 1 hour after adding chitosan, p.p.m. | 10.8 | 8.68 | 8.07 | 8.07 | 6.90 | 3.65 |
| Tannin removed, (mg. tannin)/(mg. chitosan) | 0.124 | 0.119 | 0.108 | 0.079 | 0.092 | 0.059 |
| Tannin removed, percent | 46 | 46 | 33 | 20 | 14 | 9 |

From this table it is seen that for the higher concentrations of tannin and polyphenolic material in the solution that approximately 46% of the tannin and polyphenolic material was removed. The chitosan was added in a Mich. Separan is a high molecular weight synthetic polymer formed from the polymerization of acrylamide. The rate of settling, in terms of percent clear liquor or supernatant liquor, was determined as a function of time.

The result is given in the Table III.

TABLE III.—SETTLING OF TURBID MATTER

| Settling time (minutes) | Percent clear liquor | |
|---|---|---|
| | Solution A | Solution B |
| 4.0 | 20 | 10 |
| 6.5 | 60 | 20 |
| 8.0 | 80 | 22 |
| 10.0 | 85 | 25 |
| 14.0 | 90 | 30 |
| 180.0 | 95 | 95 |

KEY: A, 100 p.p.m. of alum plus 0.5 p.p.m. of chitosan; B, 100 p.p.m. of alum plus 0.5 p.p.m. of Separan.

From the results it is seen that the coagulation solution of alum and chitosan coagulates at a faster rate than the coagulation solution of alum and Separan. At the four-minute time interval, the solution of alum and chitosan has separated almost twice as rapidly as the solution of alum and Separan. At six and one-half minutes, the solution of alum and chitosan has worked approximately three times as rapidly as the solution of alum and Separan. At eight minutes the solution of alum and chitosan has worked approximately four times as rapidly as the solution of alum and Separan.

EXAMPLE IV

Some industrial and domestic water supplies possess high levels of "temporary" hardness. This consists of calcium or magnesium bicarbonate or mixtures of both. A common treatment practice is to convert these bicarbonates to the insoluble carbonates by addition of lime and to remove the carbonate precipitates by settling and/or filtration. The precipitates are, in general, of very small particle size and clarification is difficult. Effective clarification aids are of value in reducing settling time and improving filterability. A standard calcium hard water was prepared by adding 62 milliliters of 1 molar sodium bicarbonate solution and 30 milliliters of 1 molar calcium chloride solution to 10 liters of distilled water and diluting to 15 liters with distilled water. One liter aliquots of the above standard hard water were "softened" by the addition of lime and various combinations of alum and chitosan and alum and a commercial clarification aid such as Separan. The samples were stirred for five minutes at 100 revolutions per minute and then 15 minutes at 20 revolutions per minute using a gang mechanical stirrer and were then allowed to settle. Samples of the supernatant liquid were removed for turbidity measurements at 2, 4 and 20 hours using an inverted vacuum siphon apparatus. Turbidity was determined photoelectrically by using 100 milliliter Nessler tubes (light path, 29.4 cm.). The photometer was calibrated with a Jackson candle turbidimeter. The softening conditions and the results are shown in the following Table IV.

TABLE IV

| | Sample | | | | |
|---|---|---|---|---|---|
| | 1 | 2 | 3 | 4 | 5 |
| Lime (p.p.m.) | 100 | 100 | 100 | 100 | 100 |
| Alum (p.p.m.) | None | 20 | 20 | None | None |
| Chitosan (p.p.m.) | None | 1.0 | None | None | None |
| Separan (p.p.m.) | None | None | 1.0 | None | 1.0 |
| Turbidity of supernatant liquid (Jackson units) | | | | | |
| Settling time (hours): | | | | | |
| 2 | 300 | 150 | 350 | 73 | 240 |
| 4 | 205 | 130 | 350 | | |
| 20 | 3 | 2 | 80 | 2 | 55 |

It is seen that with only lime added, no other coagulations such as alum, chitosan or Separan, that in the first 4 hours of settling that substantially no settling took place. With the addition of alum and chitosan it is seen that considerable settling occurred in the first 2 and 4 hours. However, with the addition of alum and Separan there was substantially no settling in the first 4 hours. With the addition of alum and chitosan at the end of 20 hours there was considerable settling, almost no turbidity in the supernatant liquid. With the addition of chitosan alone, no alum, in the first 2 hours there was considerable settling. In fact, the addition of chitosan alone appears to give better settling than when a coagulation agent such as alum is used. A comparison of the settling with the use of chitosan and with the use of Separan indicates that chitosan will settle the solids in the supernatant liquid better than Separan will settle the solids in the supernatant liquid.

EXAMPLE V

A standard magnesium hard water was prepared by adding 62 milliliters of 1 molar sodium bicarbonate and 112 milliliters of 1 molar magnesium chloride to 10 liters of distilled water and then diluting to 15 liters. One liter aliquots of the magnesium hard water were treated with lime and either chitosan or Separan as in the preceding Example IV. The materials added and the results are illustrated in the following Table V. In sample numbers 1, 2, 5 and 6 the lime was added to the hard water and then either the chitosan or Separan was added. In sample numbers 3 and 4 either the chitosan or Separan was added to the hard water and then the lime added. In the rate of settling it is seen from Table V that the order of adding the lime and either chitosan or Separan appears to play an important role.

TABLE V

| | Sample Number | | | | | |
|---|---|---|---|---|---|---|
| | 1 | 2 | 3* | 4* | 5 | 6 |
| Lime (p.p.m.) | 150 | 150 | 150 | 150 | 150 | 150 |
| Chitosan (p.p.m.) | 1 | | 1 | | 2 | |
| Separan (p.p.m.) | | 1 | | 1 | | 2 |
| Turbidity of supernatant liquid (Jackson units) | | | | | | |
| Settling time (hours): | | | | | | |
| 2.0 | 40 | 43 | 58 | 17 | 14 | 9 |
| 3.5 | 12 | 53 | 7 | 1 | 3 | 4 |
| 5.0 | 5 | 43 | 2 | 1 | 3 | 2 |
| 6.0 | 1 | 53 | 2 | 1 | 3 | 1 |

*Chitosan or Separan added before lime.

From Table V it is seen that generally the chitosan and the Separan in conjunction with the lime give comparable results. However, with the lime added first the chitosan at a concentration of 1 p.p.m. appears to coagulate the impurities in the supernatant liquid at a faster rate, and more thoroughly, than the Separan at the same concentration. In regard to the adding of the lime before the chitosan or before the addition of the Separan it is seen that the Separan appears to coagulate the impurities in the supernatant liquid at a faster rate for the same concentration of chitosan and Separan, 1 p.p.m. When the concentration of the chitosan and Separan is raised to 2 p.p.m. and added after the lime has been added, then the chitosan and the Separan coagulate the impurities in the supernatant liquid at approximately the same rate and to the same degree. With magnesium hardness both the chitosan and the Separan appear to nearly completely clarify the supernatant liquid.

EXAMPLE VI

A natural colored water having 38 chloroplatinate color units was treated with sodium bicarbonate, alum and either chitosan or Separan. The mixtures of water and coagulants were stirred for 15 minutes and then allowed to settle for 17 hours. The color was measured in the supernatant liquid in a spectrophotometer at 420 millimicrons. The optical densities determined with the spectrophotometer were converted to chloroplatinate color units by standardization with chloroplatinate solutions. The concentration of the additives, sodium bicarbonate and the results are given in Table VI.

TABLE VI.—SETTLING OF TURBID MATTER

|  | Sample Number | | | | | |
|---|---|---|---|---|---|---|
|  | 1 | 2 | 3 | 4 | 5 | 6 |
| NaHCO₃ added (p.p.m.) | 50 | 50 | 50 | 50 | 50 | 50 |
| Alum added (p.p.m.) | 20 | 20 | 20 |  | 20 |  |
| Chitosan added (p.p.m.) |  | 0.5 | 1.0 | 1.0 |  |  |
| Separan added (p.p.m.) |  |  |  |  | 1.0 | 1.0 |
| Color units at 17 hours | 53 | 12 | 12 | 46 | 38 | 38 |
| Remarks | (¹) | (²) | (²) | (³) | (³) | (⁴) |

¹ Slightly turbid.
² Precipitate settled well.
³ No precipitate.
⁴ Slight precipitate.

From the data in Table VI it is seen that the use of sodium bicarbonate and alum alone have very little effect in producing a precipitate. The addition of chitosan with the sodium bicarbonate and alum produced a precipitate. The use of sodium bicarbonate and chitosan without alum had substantially no effect in producing a precipitate. The use of Separan with sodium bicarbonate and either with alum or without alum had very little effect and did not produce much of a precipitate. These results indicate that the use of chitosan with alum shows good decolorization.

EXAMPLE VII

A suspension of montmorillonite clay was prepared by adding 10 grams of sieved clay to 1 liter of distilled water and allowing the suspension to settle for 24 hours. The turbid supernatant liquid was found to contain 244 p.p.m. of suspended solids. The Jackson turbidimeter unit reading was 350. 1 liter portions of the above standard turbid water were treated with various quantities of lime, alum and either chitosan or Separan. The samples were stirred 15 minutes and then allowed to settle. The turbidities of the supernatant liquid were measured after one-half hour and 1 hour. The additives, quantities, and results are given in Table VII.

TABLE VII.—SETTLING OF TURBID MATTER

|  | Sample Number | | | | | |
|---|---|---|---|---|---|---|
|  | 1 | 2 | 3 | 4 | 5 | 6 |
| Alum added (p.p.m.) | 100 | 100 | 100 | 100 | 100 | 100 |
| Lime added (p.p.m.) |  | 2.5 | 12.5 |  | 2.5 | 12.8 |
| pH | 4.3 | 6.4 | 4.7 | 4.3 | 6.6 | 4.0 |
| Chitosan added (p.p.m.) | 1 | 1 | 1 | 0 | 0 | 1 |
| Separan added (p.p.m.) |  |  |  | 1 | 1 |  |
| Turbidity after (minutes): |  |  |  |  |  |  |
| 30 | 4 | <1 | <1 | 4 | <1 | <1 |
| 60 | 4 | <1 | <1 | 4 | <1 | <1 |

It is seen that the use of chitosan in conjunction with alum or Separan in conjunction with alum, without the use of lime, does not reduce the turbidity below 4. The use of chitosan in conjunction with both alum and lime may reduce the turbidity to less than 1. Similarly, the use of Separan in conjunction with both alum and lime reduces the turbidity to less than 1. From these results it can be stated that the chitosan and the Separan reduce the turbidity to about the same degree.

EXAMPLE VIII

A kaolinite (kaolinite No. 4, Oneal Pit, Macon, Georgia) clay suspension was prepared in the same manner as the preparation of the montmorillonite suspension of Example VII in that 10 grams of the kaolinite clay was sieved and added to 1 liter of distilled water and allowed to settle for 24 hours. The supernatant liquid had a pH of 6.3 and the Jackson turbidity units measured 400. 1 liter aliquots of the suspension were treated with alum, lime and either chitosan or Separan. The results of the treatment are presented in Table VIII.

TABLE VIII.—SETTLING OF TURBID MATTER

|  | Sample Number | | | | | |
|---|---|---|---|---|---|---|
|  | 1 | 2 | 3 | 4 | 5 | 6 |
| Alum added (p.p.m.) | 100 | 100 | 100 | 100 | 100 | 100 |
| Lime added (p.p.m.) |  | 25.0 | 12.5 |  | 25.0 | 12.5 |
| pH | 4.0 | 7.0 | 4.5 | 4.3 | 7.1 | 4.7 |
| Chitosan added (p.p.m.) | 1.0 | 1.0 | 1.0 |  |  |  |
| Separan added (p.p.m.) |  |  |  | 1.0 | 1.0 | 1.0 |
| Turbidity after (minutes): |  |  |  |  |  |  |
| 30 | 165 | <1 | 165 | 32 | <1 | 205 |
| 75 | 152 | <1 | 132 | 27 | <1 | 165 |

From the above it is seen that the use of chitosan and alum without the use of lime has very little effect in reducing the turbidity of the supernatant liquid. The use of Separan and alum without the use of lime does not appreciably reduce the turbidity of the supernatant liquid. However, the use of chitosan, alum and lime reduces the turbidity of the supernatant liquid to a value less than one when sufficient lime is added. Similarly, the use of Separan and alum and lime, when sufficient lime is added, reduces the turbidity to less than one. However, when insufficient lime is added with the use of Separan and alum, the turbidity appears to be exceedingly high, even higher than when Separan is used alone. Further, it appears that, in this particular instance and with this particular clay, the chitosan and Separan function approximately equivalently in regard to precipitating the suspended solids in the supernatant liquid.

A partially deaminated chitin was prepared by allowing the crab shell with crab meat on the shell to stay in a closed container for approximately one week and at room temperature. Upon opening the closed container, there was given off an odor of ammonia. Then, the partially deaminated chitin was treated with hydrochloric acid, approximately 1 normal, at room temperature for about two hours to remove the calcium carbonate. Then, the protein was removed from the crab shell by heating at about 100° C. with approximately a three (3%) percent sodium hydroxide solution. The shell was treated with a forty (40%) percent caustic soda solution for two hours at about 150° C. to remove some of the acetyl groups from the partially deaminated chitin so as to form a partially deaminated and deacylated chitosan. The results of using a partially deaminated and partially deacylated derivative of chitin are presented in the following Tables IX, X, and XI. The nitrogen content of non-deacylated and non-deaminated chitin is theoretically 6.9% while that of completely deacetylated chitin is 8.7%. In the absence of deamination, the degree of deacetylation should be determinable from the nitrogen content.

EXAMPLE IX

A suspension of kaolinite clay was prepared as outlined in above Example VIII. This suspension was treated with various derivatives of chitin or various forms of chitosan. The suspensions were stirred for five minutes at 100 revolutions per minute and, then, stirred for fifteen minutes at 20 revolutions per minute and allowed to settle. The turbidities of the supernatant liquid were determined after one-half hour, one hour, two hours and three hours of settling. The results are presented in Table IX.

TABLE IX.—SETTLING OF TURBID MATTER

|  | Sample Number | | | | | | |
|---|---|---|---|---|---|---|---|
|  | 1 | 2 | 3 | 4 | 5 | 6 | 7 |
| Chitosan (percent nitrogen) | 5.5 | 5.5 | 7.85 | 7.85 | 7.60 | 7.60 |  |
| (Percent deacetylation) | ? | ? | 53 | 53 | 39 | 39 |  |
| Chitosan added (p.p.m.) | 1.0 | 0.5 | 1.0 | 0.5 | 1.0 | 0.5 |  |
| Turbidity after (minutes): | Jackson turbidity units | | | | | | |
| 30 | ¹270 | 140 | ¹300 | 125 | ¹225 | 40 | >300 |
| 60 | ¹270 | 115 | ¹300 | 95 | ¹240 | 38 | >300 |
| 120 | ¹270 | 90 | ¹300 | 80 | ¹240 | 90 | >300 |
| 180 | ¹240 | 75 | ¹240 | 67 | ¹190 | 30 | >300 |

¹ Approximately.

It is seen that the supernatant liquid which did not have the benefit of the chitosan added, has the highest turbidity. In fact the turbidity never went below 300 Jackson units. The partially deaminated chitosan, see samples 1 and 2, reduced the turbidity of the supernatant liquid. The samples with the highest degree of deacetylation, samples No. 3 and 4, reduce the turbidity, both more and less, for corresponding parts per million of chitosan added, than the partially deaminated chitosan. The samples with the lesser degree of deacetylation of the chitosan reduce the turbidity a greater degree than the partially deaminated and deacetylated samples. In all instances, it is seen that the lesser amount of chitosan and deaminated chitosan added was more effective than with a greater concentration of chitosan and deaminated chitosan.

EXAMPLE X

A montmorillonite clay was prepared as stated in Example VII. The clay solution was prepared and the supernatant liquid was treated with chitosan and deaminated chitosan. These supernatant liquids were stirred for fifteen minutes at twenty revolutions per minute and allowed to settle. The turbidities were determined on the supernatant liquids after one-half hour, one hour, two hours and three hours of settling. The results are presented in the following Table X.

TABLE X.—SETTLING OF TURBID MATTER

|  | Sample Number | | | | | | |
| --- | --- | --- | --- | --- | --- | --- | --- |
|  | 1 | 2 | 3 | 4 | 5 | 6 | 7 |
| Chitosan (percent nitrogen) | 5.5 | 5.5 | 7.85 | 7.85 | 7.6 | 7.6 | |
| (Percent deacetylation) | ? | ? | 53 | 53 | 39 | 39 | |
| Chitosan added (p.p.m.) | 1.0 | 0.5 | 1.0 | 0.5 | 1.0 | 0.5 | |
| Turbidity after (minutes): | Jackson Turbidity units | | | | | | |
| 30 | 18 | 32 | 20 | 36 | 28 | 48 | 62 |
| 60 | 18 | 26 | 11 | 27 | 25 | 27 | 48 |
| 120 | 18 | 24 | 11 | 25 | 21 | 25 | 46 |
| 180 | 12 | 22 | 8 | 22 | 15 | 22 | 40 |

It is seen that the supernatant liquid without the benefit of chitosan added showed the lowest degree of settling and had the highest Jackson-turbidity-unit reading. In samples No. 1 and 2, the partially deaminated chitosan, it is seen that there was effective treatment of the supernatant liquid and that the suspended solids in the supernatant liquid were partially removed so as to decrease the Jackson-turbidity-unit reading. With the chitosan having the highest degree of deacetylation, see samples 3 and 4, it is seen that there was effective removal of the suspended solids in the supernatant liquid. With the chitosan having the lower removal of acetyl groups or having a lower degree of deacetylation, see samples 5 and 6, there was a removal of the suspended solids in the supernatant liquid, but the removal was not as good as with the partially deaminated chitosan. Also, it is seen that the higher concentration of the chitosan and partially deaminated chitosan added resulted in a more effective reduction in the suspended solids and the supernatant liquid. This is to be contrasted with the test run on kaolinite clay, see preceding Example IX, where the lower concentration of the chitosan added and partially deaminated chitosan added gave a more effective reduction of suspended solids in the supernatant liquid.

EXAMPLE XI

The chitosan prepared from chitin, the chitin being prepared by treating crab shell with hydrochloric acid and, then, removing protein by the use of caustic soda, is referred to as normal chitin, see following Table XI. The partially deaminated chitin prepared by allowing the crab shells to remain in a moist atmosphere for a period of approximately a week at room temperature to allow bacterial action to decompose the crab shells is referred to as partially deaminated chitin, see following Table XI. The chitosan was prepared from both normal and partially deaminated chitin and the temperature of treating with a sodium hydroxide concentration, the time of treatment and the concentration of the sodium hydroxide is presented in following Table XI.

TABLE XI

|  | Chitosan sample Number | | | |
| --- | --- | --- | --- | --- |
|  | 1 | 2 | 3 | 4 |
| Chitin | (¹) | (¹) | (¹) | (²) |
| NaOH concentration | 50 | 50 | 70 | 40–60 |
| Temperature (treatment, °C.) | 137 | 132 | 178 | 150 |
| Time (treatment, minutes) | 60 | 30 | 60 | 120 |
| Viscosity (centipoises) (1% concentration chitosan in N/10 acetic acid) | 60 | 90 | 10 | 900 |
| Percent nitrogen in chitosan | 7.85 | 7.60 | 7.90 | 5.5 |
| Percent deacetylation of chitosan | 53 | 39 | 56 | |

¹ Normal.
² Partially deaminated.

The percent of nitrogen in the chitosan was determined and, then, the percent of deacetylation of the chitosan was calculated as previously stated from the percent nitrogen in the chitosan. It was not possible to calculate the percent of deacetylation of the partially deaminated chitosan by this method as some of the nitrogen had been removed and the percent of nitrogen was less than the theoretical percent nitrogen in chitin. The interesting feature of Table XI is that the viscosity of the partially deaminated chitosan in one tenth normal acetic acid, a one (1%) percent concentration of partially deaminated chitosan, was exceedingly high at 900 centipoises. This is to be compared with the viscosity for the same concentration of chitosan in acetic acid and chitosan having various degrees of deacetylation. The range for the three samples of chitosan see samples 1, 2, and 3, varies from 10 to 90. This shows that the partially deaminated chitosan has approximately, at least, ten times the viscosity of chitosan. From this it may be concluded that partially deaminated chitosan or partially deaminated and partially deacetylated chitin can be used as a viscosity builder in solution.

From the foregoing it is seen that we have provided a use for chitosan and for partially deaminated and partially deacetylated chitin in that these may be used for treating turbid matter in an aqueous solution to help remove the turbid matter from the aqueous solution. The value of removing the turbid matter in aqueous solution can be considerable. For example, the treatment of waste water such as material from a mining operation and the use of purification of tailings from a mining operation can be accelerated. The treatment of hard water or temporary hard water can be accomplished with the use of chitosan and partially deaminated chitosan. The agglomerated impurity or turbid matter is discarded after separation. Also, the removal of tannin and polyphenolic materials from aqueous medium can be realized with the use of chitosan. Further, we have presented a method for making a partially deaminated and partially deacetylated chitin. This partially deaminated and partially deacetylated chitin can be used to increase the viscosity of liquids. For example, it can be presumed that the partially deaminated and partially deacetylated chitin can be used to increase the viscosity of salad dressing, cheese dressings, and the like. Further, it can be presumed that chitosan and partially deaminated and partially deacetylated chitin can be used as food additives and, also, can be used in the manufacture of adhesives such as phenolic resins.

Having presented our invention, what we claim is:

1. A method for treating an aqueous medium to remove an impurity, said method comprising:
   (a) adding dissolved chitosan in a solution to said aqueous medium to form an agglomerate comprising said impurity and said chitosan,
   (b) separating said agglomerate and said aqueous medium, and
   (c) discarding said agglomerate.

2. A method according to claim 1 and wherein said impurity is tannin.

3. A method according to claim 1 and wherein said impurity is a polyphenolic material.

4. A method according to claim 1 and wherein said impurity is a suspended solid.

5. A method according to claim 1 and wherein said impurity consists of an insoluble substance selected from a compound of an alkaline earth metal.

6. A method according to claim 1 and wherein said impurity consists of an insoluble substance selected from the group consisting of a compound of calcium, magnesium, strontium and barium, and mixtures thereof.

7. A method according to claim 1 and wherein said impurity consists of a compound of calcium.

8. A method according to claim 1 and wherein said impurity consists of a compound of magnesium.

9. A method according to claim 1 and wherein said impurity consists of a compound of strontium.

10. A method according to claim 1 and wherein said impurity consists of a compound of barium.

11. A method according to claim 1 and comprising:
    (a) allowing said agglomerate to settle from said aqueous medium.

12. A method according to claim 1 and comprising:
    (a) filtering said aqueous medium to remove said agglomerate.

13. A method for treating an impurity in an aqueous medium, said method comprising:
    (a) adding dissolved chitosan in a solution and a coagulant selected from the group consisting of an aluminum salt and a ferric salt to said aqueous medium to form an agglomerate comprising said impurity, said chitosan and a floc of either aluminum hydroxide or ferric hydroxide.

14. A method according to claim 13 and wherein said impurity is tannin.

15. A method according to claim 13 and wherein said impurity is a polyphenolic material.

16. A method according to claim 13 and wherein said impurity is a suspended solid.

17. A method according to claim 13 and wherein said impurity consists of an insoluble substance selected from a compound of an alkaline earth metal.

18. A method according to claim 13 and wherein said impurity consists of an insoluble substance selected from the group consisting of a compound of calcium, magnesium, strontium and barium, and mixtures thereof.

19. A method according to claim 13 and wherein said impurity consists of a compound of calcium.

20. A method according to claim 13 and wherein said impurity consists of a compound of magnesium.

21. A method according to claim 13 and wherein said impurity consists of a compound of strontium.

22. A method according to claim 13 and wherein said impurity consists of a compound of barium.

23. A method according to claim 13 and comprising:
    (a) separating said agglomerate from said aqueous medium.

24. A method according to claim 13 and comprising:
    (a) allowing said agglomerate to settle from said aqueous medium.

25. A method according to claim 13 and comprising:
    (a) filtering said aqueous medium to remove said agglomerate.

26. A method for treating an aqueous medium to remove an impurity, said method comprising:
    (a) adding a partially deaminated and partially deacetylated derivative of chitin to said aqueous medium to form an agglomerate comprising said impurity and said deaminated and deacetylated derivative of chitin,
    (b) separating said agglomerate and said aqueous medium, and
    (c) discarding said agglomerate.

27. A method according to claim 26 and wherein said impurity is tannin.

28. A method according to claim 26 and wherein said impurity is a polyphenolic material.

29. A method according to claim 26 and wherein said impurity is a suspended solid.

30. A method according to claim 26 and wherein said impurity consists of an insoluble substance selected from a compound of an alkaline earth metal.

31. A method according to claim 26 and wherein said impurity consists of an insoluble substance selected from the group consisting of a compound of calcium, magnesium, strontium and barium, and mixtures thereof.

32. A method according to claim 26 and wherein said impurity consists of a compound of calcium.

33. A method according to claim 26 and wherein said impurity consists of a compound of magnesium.

34. A method according to claim 26 and wherein said impurity consists of a compound of strontium.

35. A method according to claim 26 and wherein said impurity consists of a compound of barium.

36. A method according to claim 26 and comprising:
    (a) allowing said agglomerate to settle from said aqueous medium.

37. A method according to claim 26 and comprising:
    (a) filtering said aqueous medium to remove said agglomerate.

38. A method for treating an aqueous medium to remove an impurity, said method comprising:
    (a) adding chitosan dissolved in a solution to said aqueous medium,
    (b) insuring sufficient agitation to mix said solution and said aqueous medium,
    (c) forming an agglomerate comprising said impurity and said chitosan,
    (d) separating said agglomerate and said aqueous medium, and
    (e) discarding said agglomerate.

39. The method of claim 38 wherein said chitosan is used in conjunction with a coagulant selected from the group consisting of an aluminum salt and a ferric salt.

40. The method of claim 38 wherein said chitosan is used in conjunction with an aluminum salt.

41. The method of claim 38 wherein said chitosan is used in conjunction with a ferric salt.

42. A method for treating an aqueous medium to remove an impurity, said method comprising:
    (a) adding a partially deaminated and partially deacetylated derivative of chitin dissolved in a solution to said aqueous medium;
    (b) insuring sufficient agitation to mix said solution and said aqueous medium;
    (c) forming an agglomerate comprising said impurity and said partially deaminated and partially deacetylated derivative,
    (d) separating said agglomerate and said aqueous medium, and
    (e) discarding said agglomerate.

43. The method of claim 42 wherein said derivative is used in conjunction with a coagulant selected from the group consisting of an aluminum salt and a ferric salt.

44. The method of claim 42 wherein said derivative is used in conjunction with an aluminum salt.

45. The method of claim 42 wherein said derivative is used in conjunction with a ferric salt.

References Cited

UNITED STATES PATENTS

| | | | |
|---|---|---|---|
| 2,040,879 | 5/1936 | Rigby | 260—211 |
| 2,795,579 | 6/1957 | Doczi | 260—211 |
| 3,155,575 | 11/1964 | Doczi et al. | 260—211 X |
| 3,297,676 | 1/1967 | Brauns | 260—211 X |

OTHER REFERENCES

Schenck, W.A.: The Nature of Lignosulphonic Acids Etc., Paper Trade Journal, vol. 117, Sept. 30, 1943, pp. 97–100 (TAPPI Section, pp. 153–156).

Pepper, J. M.: Isolation and Utilization of Lignosulfonic Acids, Pulp and Paper Magazine of Canada, February 1945, pp. 83–90.

MICHAEL E. ROGERS, Primary Examiner

U.S. Cl. X.R.

195—29; 210—54; 252—180; 260—211